United States Patent
Kojima et al.

(10) Patent No.: US 8,964,414 B2
(45) Date of Patent: Feb. 24, 2015

(54) DC POWER SUPPLY INCLUDING RESONANT CIRCUIT FOR REDUCING SWITCHING LOSSES

(75) Inventors: Tetsuo Kojima, Hitachinaka (JP);
Yuichiro Nozaki, Hitachinaka (JP);
Masafumi Makino, Hitachinaka (JP);
Takeshi Shinomiya, Hitachinaka (JP);
Tetsu Sugiura, Hitachinaka (JP)

(73) Assignees: Hitachi, Ltd., Tokyo (JP); Hitachi Mito Engineering Co., Ltd., Ibaraki (JP)

( * ) Notice: Subject to any disclaimer, the term of this patent is extended or adjusted under 35 U.S.C. 154(b) by 363 days.

(21) Appl. No.: 13/480,503

(22) Filed: May 25, 2012

(65) Prior Publication Data
US 2012/0300501 A1  Nov. 29, 2012

(30) Foreign Application Priority Data
May 25, 2011  (JP) .................................. 2011-116758

(51) Int. Cl.
*H02M 1/34* (2007.01)
*H02M 3/335* (2006.01)

(52) U.S. Cl.
CPC ........ *H02M 3/33576* (2013.01); *Y02B 70/1433* (2013.01)
USPC ..... 363/17; 363/21.02; 363/56.05; 363/56.12

(58) Field of Classification Search
USPC ............... 363/16, 17, 21.02, 56.05, 56.12, 98
See application file for complete search history.

(56) References Cited

U.S. PATENT DOCUMENTS

| | | | |
|---|---|---|---|
| 5,657,215 A * | 8/1997 | Faulk | 363/41 |
| 5,877,947 A * | 3/1999 | Chen et al. | 363/53 |
| 5,886,884 A * | 3/1999 | Baek et al. | 363/48 |
| 6,349,044 B1 * | 2/2002 | Canales-Abarca et al. | 363/17 |
| 2007/0139972 A1 * | 6/2007 | Eckl et al. | 363/16 |
| 2010/0220500 A1 | 9/2010 | Mino et al. | |
| 2012/0002449 A1 * | 1/2012 | Park et al. | 363/21.18 |

FOREIGN PATENT DOCUMENTS

| | | |
|---|---|---|
| GB | 2459764 A | 11/2009 |
| JP | 4-368464 | 12/1992 |

(Continued)

OTHER PUBLICATIONS

Ruan, Xinbo et al; 'A Novel Zero-Voltage and Zero-Current-Switching PWM Full-Bridge Converter Using Two Diodes in Series With the Lagging Leg', IEEE Transactions on Industrial Electronics, vol. 48, No. 4, Aug. 2001. [pp. 777-785].

*Primary Examiner* — Fred E Finch, III
(74) *Attorney, Agent, or Firm* — Antonelli, Terry, Stout & Kraus, LLP.

(57) ABSTRACT

A DC power supply including a resonant circuit on a secondary side of a transformer suppresses a surge voltage during power recovery of diodes constituting a rectifier circuit, correctly estimates a load current from a secondary current of the transformer, and adjusts supplied power when a load is light. The DC power supply includes a DC voltage source, a converter, a transformer, a rectifier circuit, a resonant circuit composed of a resonant switch and a resonant capacitor, a filter reactor, a filter capacitor, a snubber diode, a snubber capacitor, a load, first and second voltage sensors, a current sensor, and a controller for controlling gate pulses of semiconductor devices constituting a converter and the resonant switch and a signal for adjusting operation timings of A/D converters converting the signals of these sensors.

3 Claims, 10 Drawing Sheets

(56) References Cited

FOREIGN PATENT DOCUMENTS

| JP | 11-187662 | 7/1999 |
|----|-----------|--------|
| JP | 2006-352959 | 12/2006 |
| JP | 2007-068349 | 3/2007 |
| JP | 2008-79403 | 4/2008 |
| JP | 2009-273355 | 11/2009 |
| JP | 2010-178501 | 8/2010 |
| JP | 2011-041387 | 2/2011 |

* cited by examiner

DC POWER SUPPLY INCLUDING RESONANT CIRCUIT FOR REDUCING SWITCHING LOSSES

The present application is based on and claims priority of Japanese patent application No. 2011-116758 filed on May 25, 2011, the entire contents of which are hereby incorporated by reference.

BACKGROUND OF THE INVENTION

1. Field of the Invention

The present invention relates to a DC power supply using semiconductor devices. More specifically, the present invention relates to a soft-switching DC power supply including a resonant circuit for reducing switching losses in semiconductor devices.

2. Description of the Related Art

A power supply for converting direct current to direct current (hereinafter referred to as a DC power supply) is used to stabilize unstable direct current voltage, change direct current voltage, or provide electric isolation between input and output. Especially, in a DC power supply for providing electric isolation between input and output, a method of downsizing an isolation transformer by increasing an applied frequency is known.

Figure 8:
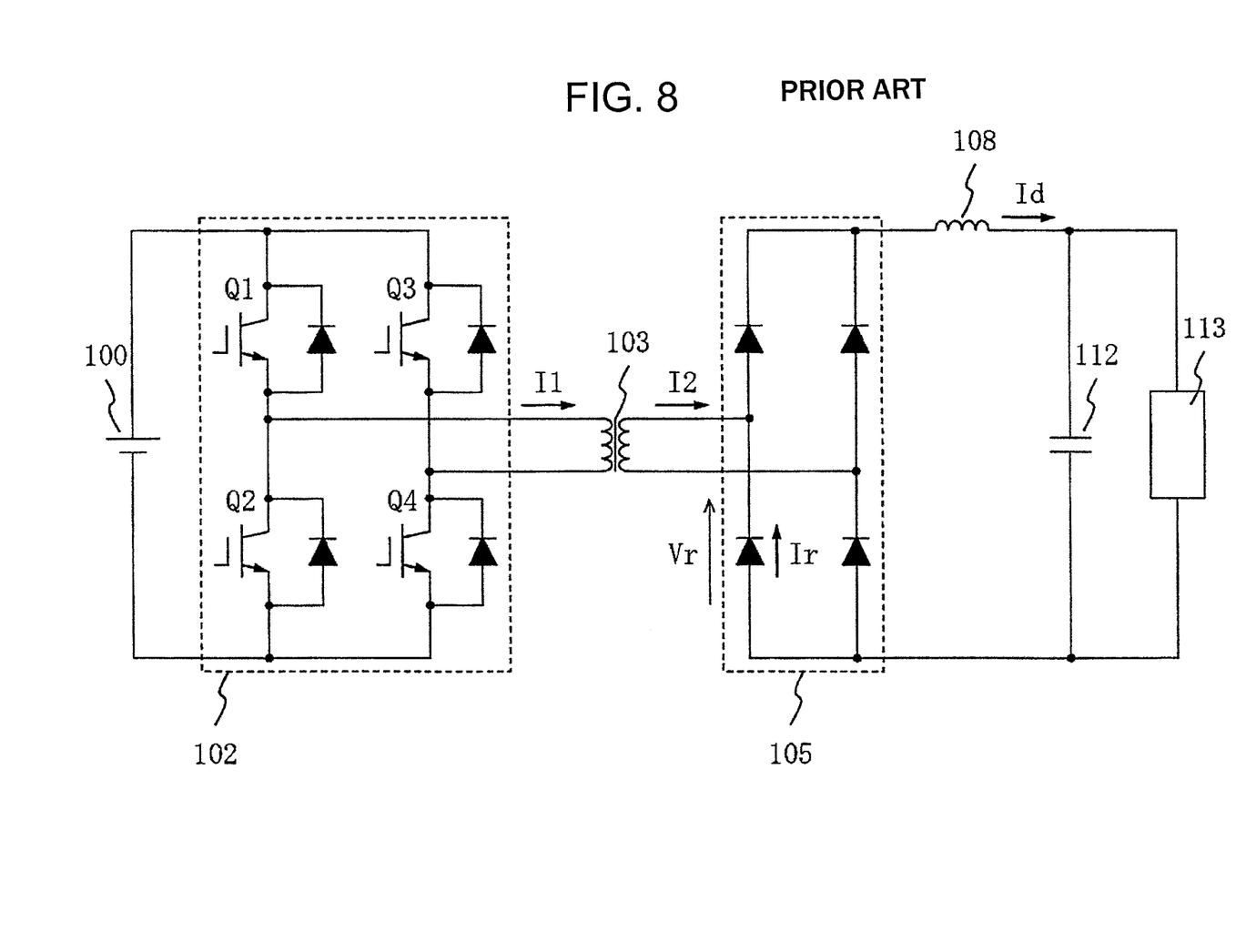
FIG. 8 shows a circuit configuration of a DC power supply according to a conventional technique (Patent Document 1)

FIG. 8 shows a circuit configuration disclosed in Japanese Patent Laid-Open Publication No. 2010-178501 (Patent Document 1) as an example. A DC power supply shown in FIG. 8 includes: a DC voltage source 100; a converter 102 for converting DC power outputted from the DC voltage source 100 into AC power; a transformer 103 for inputting the AC power outputted from the converter 102; a rectifier circuit 105 for converting the AC power outputted from the transformer 103 into DC power; a filter reactor 108 and filter capacitor 112 for smoothing the DC power outputted from the rectifier circuit 105; and a load 113 connected in parallel to the filter capacitor 112.

Figure 9:
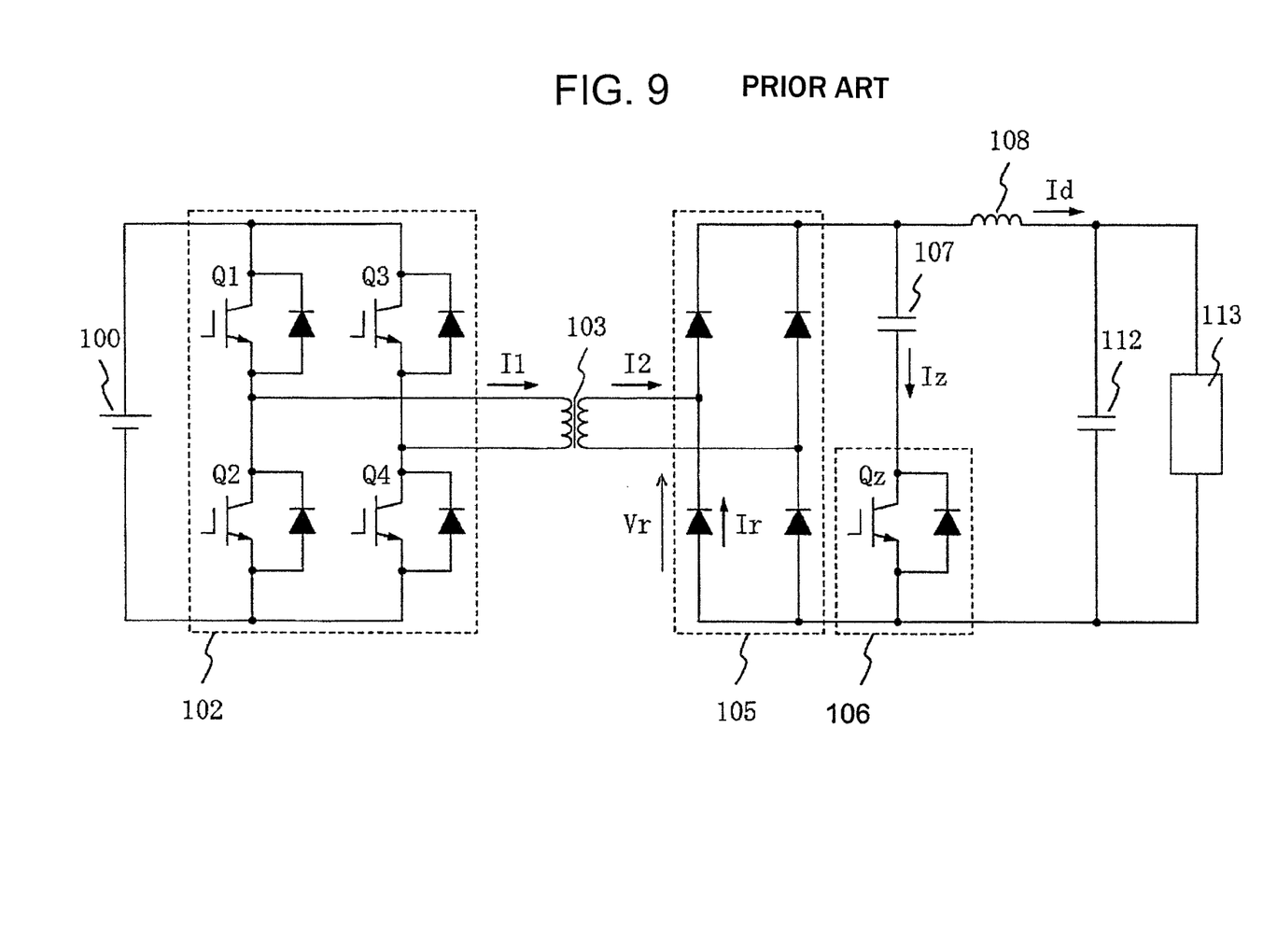
FIG. 9 shows a circuit configuration of a DC power supply according to another conventional technique (Patent Document 2 and the like)

In the DC power supply shown in FIG. 8, switching losses in semiconductor devices composing the converter 102 are increased in accordance with an applied frequency. Accordingly, a technique (soft-switching) for reducing switching losses using a resonant circuit is suggested. FIG. 9 shows a circuit configuration disclosed in Japanese Patent Laid-Open Publication No. 4-368464 (Patent Document 2) and O. Deblecker, A. Moretti, and F. Vallee: "Comparative Analysis of Two zero-Current Switching Isolated DC-DC Converters for Auxiliary Railway Supply" SPEEDAM2008 (Non-Patent Document 1) as an example.

A DC power supply shown in FIG. 9 includes: a DC voltage source 100; a converter 102 for converting DC power outputted from the DC voltage source 100 into AC power; a transformer 103 for inputting the AC power outputted from the converter 102; a rectifier circuit 105 for converting the AC power outputted from the transformer 103 into DC power; a resonant circuit which is composed of a resonant switch 106 and a resonant capacitor 107 and which is connected in parallel to a DC output side of the rectifier circuit 105; a filter reactor 108 and filter capacitor 112 for smoothing the DC power outputted from the rectifier circuit 105; and a load 113 connected in parallel to the filter capacitor 112.

The DC power supply shown in FIG. 9 activates the resonant switch 106 at the timing of turning off the converter 102 to superpose a resonant current Iz on a secondary current I2. Accordingly, the secondary current I2 can be temporarily reduced to zero and a primary current I1 can be temporarily reduced to a level of only excitation current. By turning off the converter 102 at this timing, the turn-off power loss of the converter 102 can be considerably reduced.

In the DC power supply shown in FIG. 8, while semiconductor devices Q1 to Q4 constituting the converter 102 are off, the primary current I1 and the secondary current I2 are zero but a free wheeling current continues to flow through diodes constituting the rectifier circuit 105. When the semiconductor devices Q1 and Q4 constituting the converter 102 are turned on, the primary current I1 and the secondary current I2 start to flow and the magnitude of the secondary current I2 matches that of a load current Id. At this time, a current having the same magnitude as that of the secondary current I2 flows through a half of the diodes constituting the rectifier circuit 105 and no current flows through the other half of the diodes.

Figure 10:
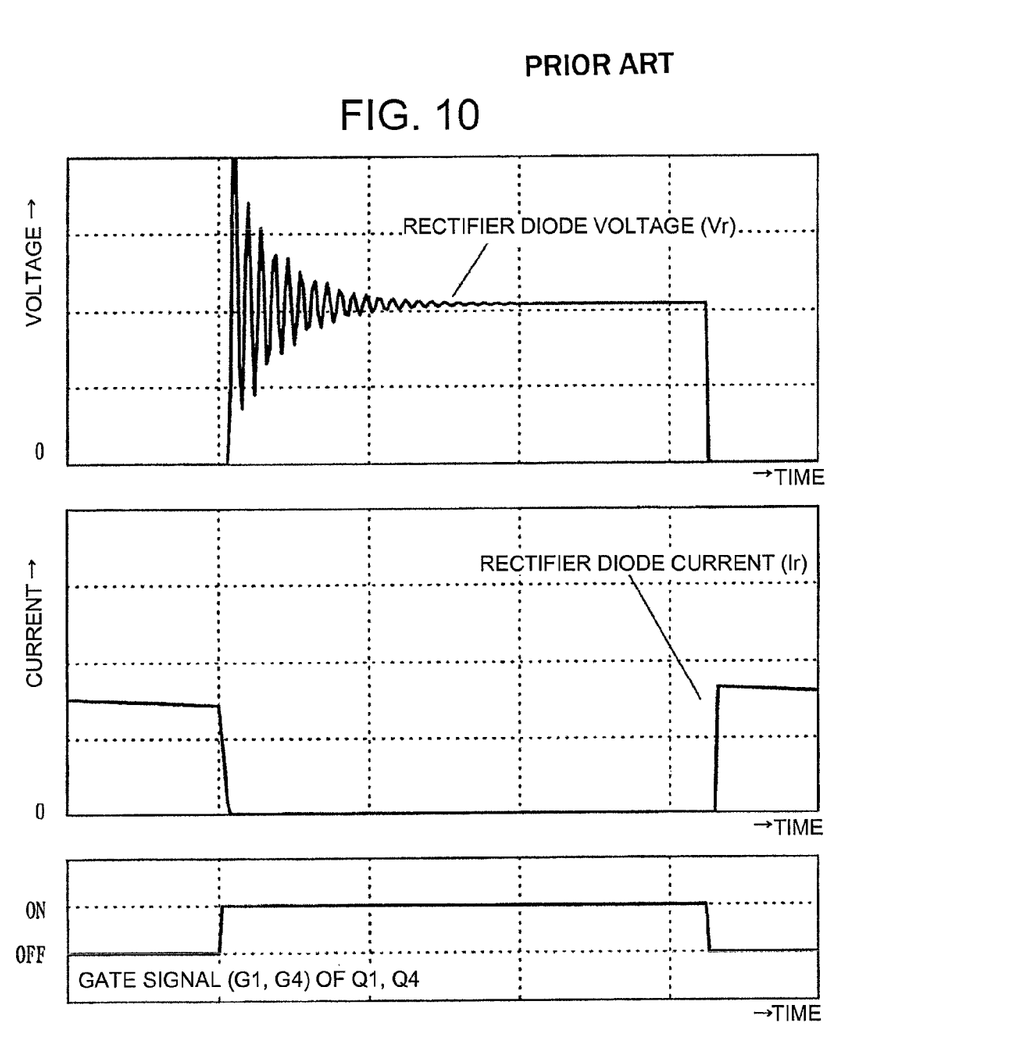
FIG. 10 shows a voltage waveform and a current waveform of a rectifier diode in the DC power supply according to the conventional technique (Patent Document 1).

A voltage waveform and a current waveform of the latter diodes are shown in FIG. 10. When a state where a current flows through the diodes is shifted to a state where the current is interrupted and a voltage is applied, carriers stored in the diodes are discharged and a current (reverse recovery current) temporarily flows in a reverse direction. Then, a serge voltage is generated. The surge voltage continues to oscillate for a while due to resonance caused by junction capacitance of the diodes and circuit inductance. A recovery phenomenon depends on characteristics of diodes. When the surge voltage is intensely generated as shown in FIG. 10, the surge voltage may exceed a device withstanding voltage and the devices may be destroyed. Even when the surge voltage does not exceed the device withstanding pressure, an electromagnetic noise of a high frequency may be generated, and accordingly, other electronic devices may be negatively affected. For example, they may be electromagnetically interfered.

As a countermeasure against a surge voltage during power recovery, a technique of providing a CR circuit (snubber circuit) in parallel to diodes constituting a rectifier circuit is known. As conventional examples of the countermeasure against the surge voltage, a DC-DC converter disclosed in Japanese Patent Laid-Open Publication No. 2006-352959 (Patent Document 3), a device for transmitting electric power disclosed in Japanese Patent Laid-Open Publication No. 2009-273355 (Patent Document 4), and a low-loss converter disclosed in Japanese Patent Laid-Open Publication No. 2008-79403 (Patent Document 5) are known.

The circuit shown in FIG. 9 as a conventional example has three problems. The first problem is how to reduce the surge voltage of the diodes constituting the rectifier circuit 105 during the power recovery.

The second problem is that it is difficult to recognize a correct load state from the secondary current I2 because the resonant current Iz, which flows through the resonant circuit composed of the resonant capacitor 107 and resonant switch 106 added to reduce the turn-off loss of the converter 102, is superposed on the secondary current I2. A current sensor for directly detecting the load current Id may be provided to recognize the correct load state. The problem here is, however, how to correctly estimate the load current Id from the secondary current I2 for saving the cost and recognize the correct load state without the current sensor for detecting the load current Id.

The third problem is how to perform the smooth control when the load is light. Since the amplitude of the resonant current Iz flowing through the resonant capacitor 107 is proportional to a DC input voltage Vs, an energy supplied by the resonant current Iz is proportional to the square of the DC input voltage Vs. When the DC input voltage Vs is high, a considerably high energy is supplied only by the resonant current Iz. Thus, it is difficult to reduce the supplied electric power.

SUMMARY OF THE INVENTION

To solve the first problem, the DC power supply according to an aspect of the present invention including a DC voltage source, a converter for converting DC power outputted from the DC voltage source to AC power, a transformer for receiving the AC power outputted from the converter, a rectifier circuit for converting the AC power outputted from the transformer to DC power, a resonant circuit composed of a resonant switch and a resonant capacitor connected in parallel to a DC output side of the rectifier circuit; a filter reactor and filter capacitor for smoothing the DC power outputted from the rectifier circuit, and a load connected in parallel to the filter capacitor, includes: a snubber circuit connected in parallel to the filter capacitor. To solve the second and third problems, the DC power supply according to the aspect of the present invention further includes: a first voltage sensor for detecting a DC voltage outputted from the DC voltage source; a current sensor for detecting a secondary current of the transformer; a second voltage sensor for detecting a voltage of the filter capacitor; and a controller for adjusting gate pulses of the converter and the resonant switch and detection timings of the first and second voltage sensors and the current sensor.

In the DC power supply according to the aspect of the present invention, the controller includes: first controlling means for inputting output signals of the first and second voltage sensors and the current sensor and adjusting supplied power by adjusting a gate pulse width in accordance with a sensor input while an operating frequency of the converter is maintained constant; and second controlling means for adjusting the supplied power by adjusting the operating frequency of the converter in accordance with the sensor input while the gate pulse width of the converter is maintained constant.

In the power supply according to the aspect of the present invention, the snubber circuit is composed of a diode bridge (snubber diode) and a capacitor (snubber capacitor) for connecting an output of the diode bridge to a DC output side of the rectifier circuit, and the controller includes means for inputting the output signal of the current sensor and performing sampling and holding in synchronization with the operating frequency of the converter during a period except for ¾ of a resonant cycle obtained by an electrostatic capacitance of the resonant capacitor and a circuit inductance during turn-on of the converter and ½ of a resonant cycle obtained by an electrostatic capacitance of the snubber capacitor and the circuit inductance.

According to the present invention, due to the snubber circuit composed of the snubber diode serving as the diode bridge connected in parallel to the filter capacitor and the snubber capacitor for connecting an output at an intermediate point of the diode bridge of the snubber diode serving as the diode bridge to the DC output side of the diodes of the rectifier circuit, the surge voltage generated during power recovery of the diodes of the rectifier circuit can be reduced and thus the electromagnetic noise can be also reduced.

Since the current sensor for the secondary current of the transformer is provided and sampling and holding are performed by inputting an output signal from the current sensor in synchronization with the operating frequency of the converter after ½ of the resonant cycle obtained by the electrostatic capacitance of the snubber capacitor and the circuit inductance from turn-on of the converter and before ¾ of the resonant cycle obtained from the electrostatic capacitance of the resonant capacitor and the circuit inductance from turn-off, the load current can be correctly estimated from the secondary current.

Since the first controlling means for adjusting the supplied power by adjusting the gate pulse width in accordance with the sensor input while the operating frequency of the converter is maintained constant and the second controlling means for adjusting the supplied power by adjusting the operating frequency of the converter in accordance with the sensor input while the gate pulse width of the converter is maintained constant are provided, the supplied power can be reduced when the load is light.

DETAILED DESCRIPTION OF THE PREFERRED EMBODIMENTS

Embodiments of the present invention will be explained below with reference to the accompanying drawings.

First Embodiment

Figure 1:
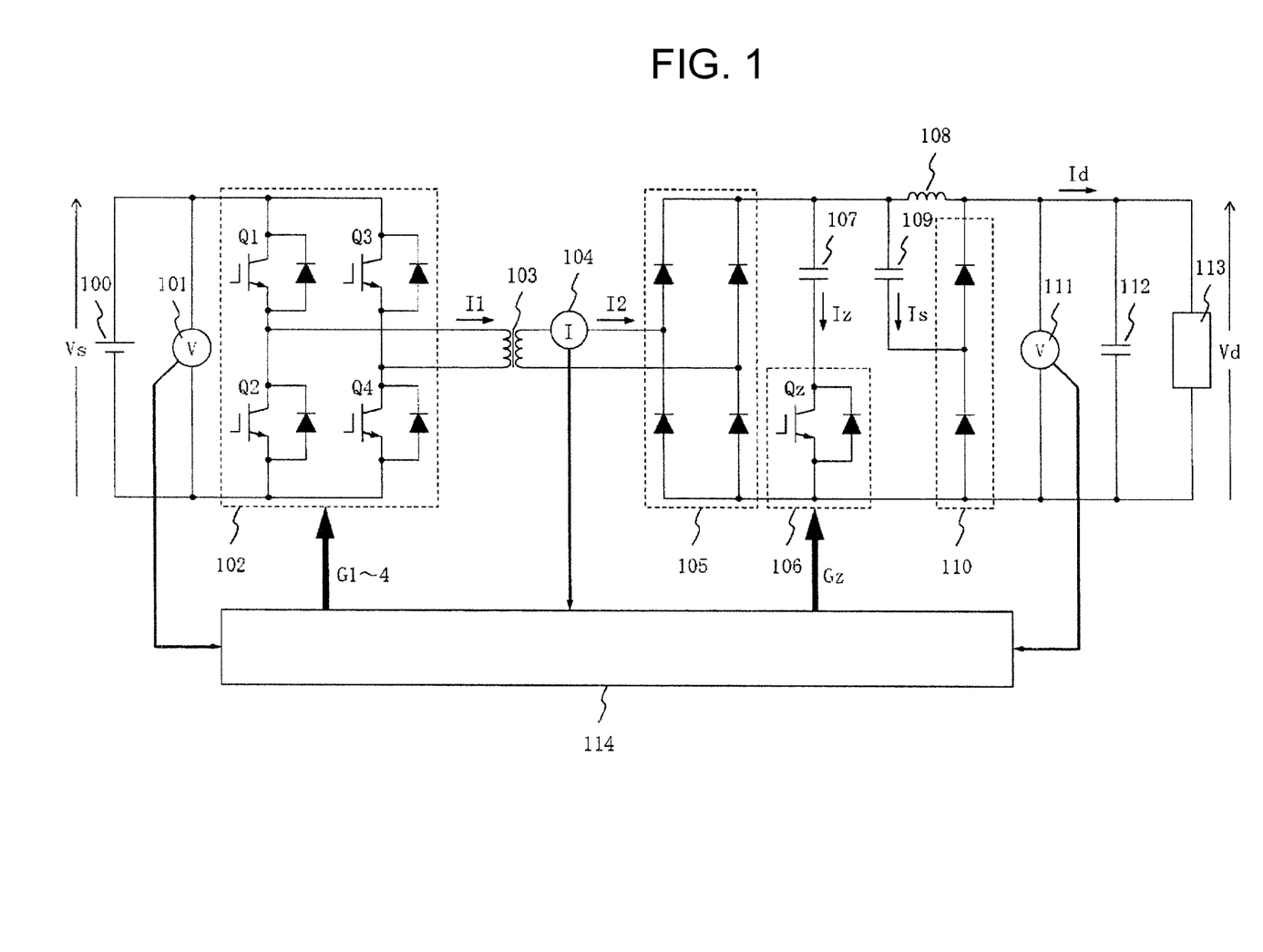
FIG. 1 shows a circuit configuration of a DC power supply according to the present invention.

FIG. 1 shows an embodiment of the present invention. A DC power supply shown in FIG. 1 includes: a DC voltage source 100; a first voltage sensor 101 for detecting a DC input voltage Vs as an output voltage of the DC voltage source 100; a converter 102 for converting DC power outputted from the DC voltage source 100 into AC power; a transformer 103 for inputting the AC power outputted from the converter 102; a current sensor 104 for detecting a secondary current I2 of the transformer 103; a rectifier circuit 105 for converting the AC power outputted from the transformer 103 into DC power; a resonant circuit which is composed of a resonant switch 106 and a resonant capacitor 107 and connected in parallel to a DC output side of the rectifier circuit 105; a filter reactor 108 and filter capacitor 112 for smoothing the DC power outputted from the rectifier circuit 105; a snubber diode 110 serving as a diode bridge connected in parallel to the filter capacitor 112;

a snubber capacitor 109 for connecting the output at the intermediate point of the diode bridge of the snubber diode 110 to the DC output side of the rectifier circuit 105; a second voltage sensor 111 for detecting a DC output voltage Vd of the filter capacitor 112; a load 113 connected in parallel to the filter capacitor 112; and a controller 114 for inputting the DC input voltage Vs detected by the first voltage sensor 101, the DC output voltage Vd detected by the second voltage sensor 111, and the secondary current I2 detected by the current sensor 104, and controlling gate signals G1 to G4 of semiconductor devices Q1 to Q4 constituting the converter 102 and a gate signal Gz of a semiconductor device Qz constituting the resonant switch 106.

Figure 2:
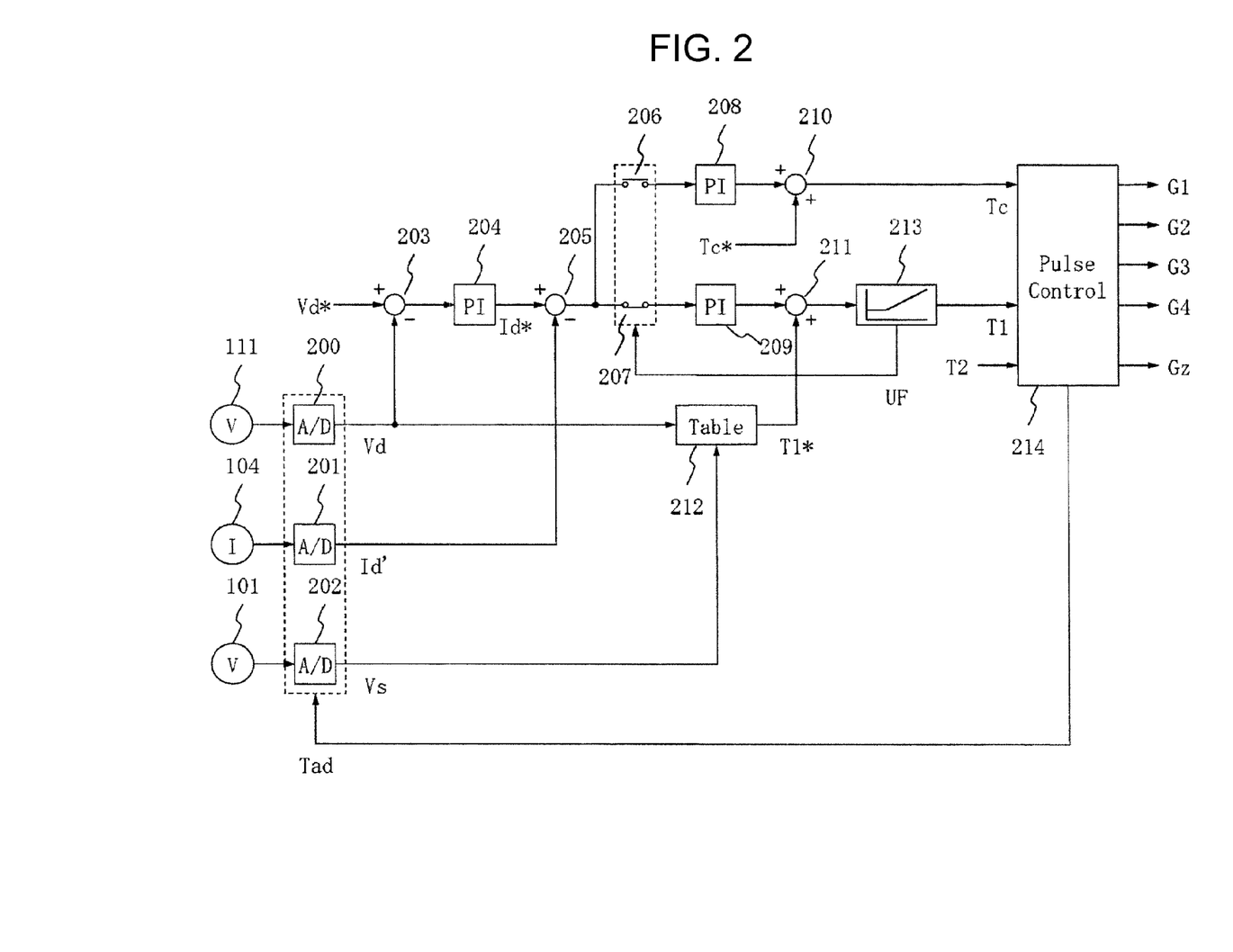
FIG. 2 shows an internal arrangement of a controller of the DC power supply according to the present invention.

FIG. 2 shows the detail arrangement of the controller 114. The controller 114 of the DC power supply shown in FIG. 2 includes: a first A/D converter 200 for inputting an output signal of the second voltage sensor 111; a second A/D converter 201 for inputting an output signal of the current sensor 104; a third A/D converter 202 for inputting an output signal of the first voltage sensor 101; a first subtractor 203 for obtaining a deviation between a DC output voltage command Vd* and a DC output voltage Vd as an output signal of the first A/D converter 200; a first PI controller 204 for inputting an output signal of the first subtractor 203 and outputting a load current command Id*; a second subtractor 205 for obtaining a deviation between the load current command Id* outputted from the first PI controller 204 and a load current estimated value Id' as an output signal of the second A/D converter 201; a second PI controller 208 for inputting an output signal of the second subtractor 205 via an A contact switch 206; a first adder 210 for obtaining a converter control cycle Tc by adding an output signal of the second PI controller 208 and an initial value Tc* of the converter control cycle; a function table 212 for inputting the DC output voltage Vd as the output signal of the first A/D converter 200 and a DC input voltage Vs as an output signal of the third A/D converter 202 and outputting a turn-on time command T1* of a semiconductor device constituting the converter 102; a third PI controller 209 for inputting an output signal of the second subtractor 205 via a B contact switch 207; a second adder 211 for obtaining the sum of the output signal of the third PI controller 209 and the turn-on time command T1* of the semiconductor devices constituting the converter 102 of the function table 212; a limiter 213 for inputting an output signal of the second adder 211, limiting a turn-on time T1 of the semiconductor devices constituting the converter 102 within a predetermined range, and outputting an underfloor flag UF determining whether an output is limited or not; and a pulse controller 214 for inputting the control cycle Tc of the converter 102 outputted from the first adder 210, the turn-on time T1 of the semiconductor devices constituting the converter 102 outputted from the limiter 213, and a turn-on time T2 of the semiconductor device constituting the resonant switch 106, and outputting gate signals G1 to G4 of semiconductor devices Q1 to Q4 constituting the converter 102, a gate signal Gz of a semiconductor device Qz constituting the resonant switch 106, and a trigger signal Tad of an A/D converter that samples and holds the first to third A/D converters 200 to 202.

In accordance with the underflow flag UF outputted from the limiter 213, the A contact switch 206 and the B contact switch 207 exclusively operate as follows.
a) When the output of the limiter 213 is within a predetermined range (T1>T1min),
 underflow flag UF: off
 A contact switch 206: opened
 first PI controller 208: reset, zero output
 first adder 210: output Tc* (fixed)
 B contact switch 207: connected
 second PI controller 209: operating
 limiter 213: output T1 (variable)
b) When the output of the limiter 213 is limited to a lower limit value (T1=T1min),
 underflow flag UF: on
 A contact switch 206: connected
 first PI controller 208: operating
 first adder 210: output Tc (variable)
 B contact switch 207: opened
 second PI controller 209: reset, zero output
 limiter 213: output T1min (fixed)

Figure 3:
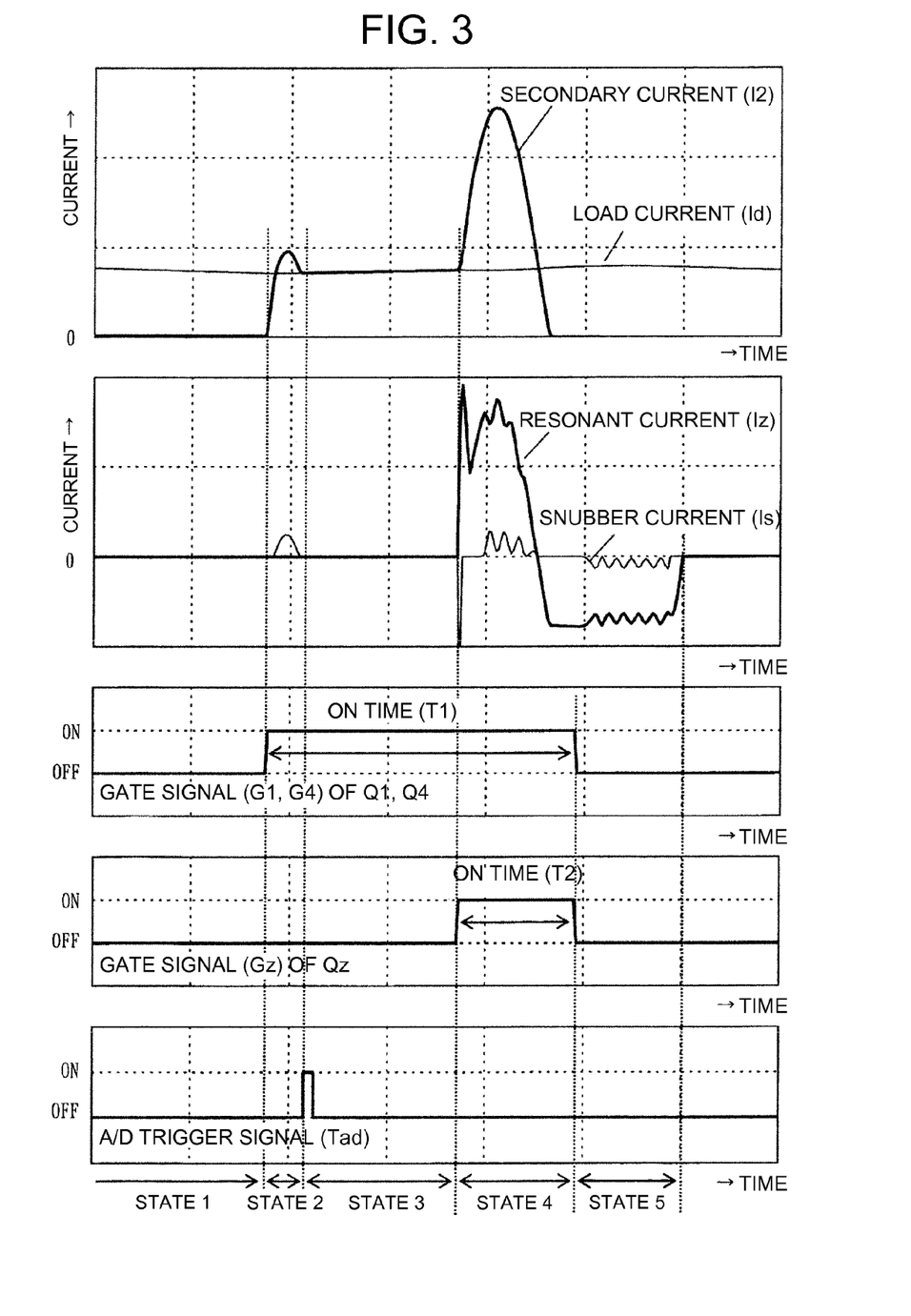
FIG. 3 shows details of a control timing as an example of an operation waveform according to the present invention.

FIG. 3 shows an operation waveform of the DC power supply according to the present invention. In FIG. 3, the following signals are shown from the top.
(1) the secondary current I2 and the load current Id
(2) the resonant current Iz and the snubber current Is
(3) the gate signals G1 and G4 of the semiconductor devices Q1 and Q4 constituting the converter 102
(4) the gate signal Gz of the semiconductor device Qz constituting the resonant switch 106
(5) the trigger signal Tad of the first to third A/D converters 200 to 202

The horizontal axis of FIG. 3 is a time axis. The state transitions from [state 1] to [state 5] with the passage of time.

[state 1] When the semiconductor devices Q1 and Q4 constituting the converter 102 are off, the secondary current I2 of the transformer 103 is zero and the load current Id continue to flow through the rectifier circuit 105.

[state 2] When the semiconductor devices Q1 and Q4 constituting the converter 102 are turned on, the secondary current I2 of the transformer 103 starts to flow, and simultaneously, the charge current Is of the snubber capacitor 109 starts to flow. Such a state is continued for approximately half of a resonant cycle obtained by the electrostatic capacitance of the snubber capacitor 109 and the circuit inductance.

[state 3] When the charging of the snubber capacitor 109 is finished, the magnitude of the secondary current I2 of the transformer 103 matches that of the load current Id. At the initial timing of such a state, the trigger signal Tad of the A/D converter for operating the first to third A/D converters is outputted and the A/D conversion (sampling and holding) is performed. Accordingly, the value of the load current Id can be obtained using the detected value of the secondary current I2 of the transformer 103.

[State 4] Before the semiconductor devices Q1 and Q4 constituting the converter 102 are turned off, the semiconductor device Qz constituting the resonant switch 106 is turned on at the timing prior to ¾ of the resonant cycle obtained by the electrostatic capacitance of the resonant capacitor 107 and the circuit inductance. The electric charge charged in the snubber capacitor 109 is instantly discharged and is charged in the resonant capacitor 107, and subsequently, the snubber capacitor 109 is recharged. The sum of the current value of the resonant current Iz and the current value of the snubber current Is is superposed on the current value of the secondary current I2 of the transformer 103, and thus the current value of the secondary current I2 of the transformer 103 is increased once. After ½ of the resonant cycle of the resonant capacitor 107, however, the current value of the secondary current I2 is decreased to zero. The secondary current I2 of the transformer 103 does not flow in the negative direction due to the diodes constituting the rectifier circuit 105, and accordingly, the current value of the secondary current I2 continues to zero. When the resonant switch 106 is turned off while the current value of the secondary current I2 of the transformer 103 is zero, the turn-off loss of the resonant switch 106 becomes zero because the resonant current Iz flowing through the resonant switch 106 is negative. When the converter 102 is turned off while the current value of the secondary current I2 of the transformer 103 is zero, the turn-off loss of the semiconductor devices Q1 to Q4 constituting the converter 102 can be considerably reduced because the primary current I1 of the transformer 103 is composed of only excitation current.

[State 5] When the semiconductor devices Q1 and Q4 constituting the converter 102 are off and the semiconductor device Qz constituting the resonant switch 106 is off, the secondary current I2 of the transformer 103 is zero, but the resonant current Iz continues to flow until the electric charge charged to the resonant capacitor 107 becomes zero. The sum of the resonant current Iz and the snubber current Is is supplied to the load 113 as the load current Id. When the resonant current Iz becomes zero, the state is retuned back to the state 1.

Figure 7:
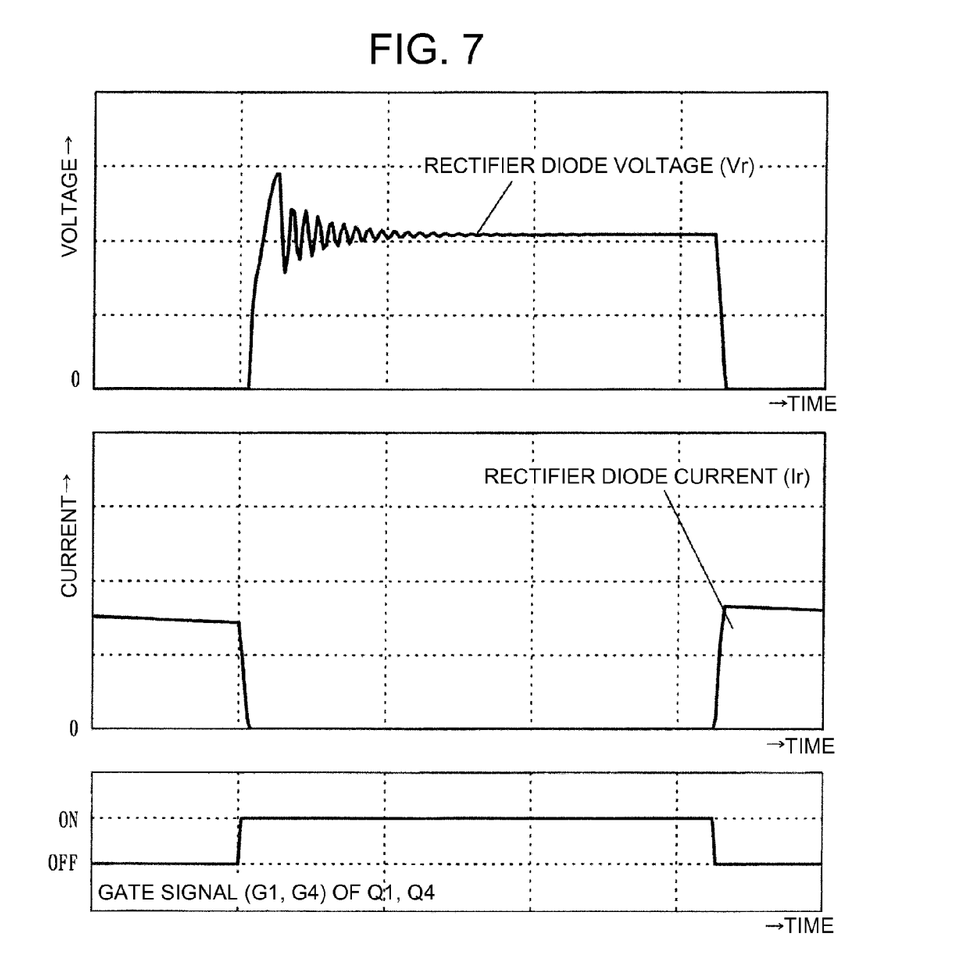
FIG. 7 shows a voltage waveform and a current waveform of a rectifier diode according to the present invention.

FIGS. 7 and 10 show an operation waveform of the DC power supply during power recovery according to the present invention. In FIGS. 7 and 10, the following signals are shown from the top.
(1) the DC output voltage Vd as a terminal voltage of the diodes constituting the rectifier circuit 105
(2) the load current Id as a current flowing through the diodes constituting the rectifier circuit 105
(3) the gate signals G1 and G4 of the semiconductor devices Q1 and Q4 constituting the converter 102

While the semiconductor devices Q1 and Q4 constituting the converter 102 are off, the primary current I1 and the secondary current I2 of the transformer 103 are zero but the free wheeling current continues to flow through the diodes constituting the rectifier circuit 105. When the semiconductor devices Q1 and Q4 are turned on from that state, the primary current I1 and the secondary current I2 of the transformer 103 start to flow and the magnitude of the secondary current I2 of the transformer 103 becomes the same as that of the load current Id. At this time, a current having the same magnitude as that of the secondary current I2 of the transformer 103 flows through a half of the diodes constituting the rectifier circuit 105 and no current flows through the other half of the diodes. A voltage waveform and a current waveform of the latter diodes are shown in FIGS. 7 and 10.

When a state where the current flows through the diodes constituting the rectifier circuit 105 transitions to a state where the current is interrupted and a voltage is applied, carriers stored in the diodes constituting the rectifier circuit 105 are discharged and a current (reverse recovery current) flows temporarily in a reverse direction. Then, a serge voltage is generated. As compared to the conventional techniques shown in FIGS. 9 and 10, it is found that the surge voltage can be reduced by the snubber circuit composed of the snubber capacitor 109 and the snubber diode 110.

Figure 4:
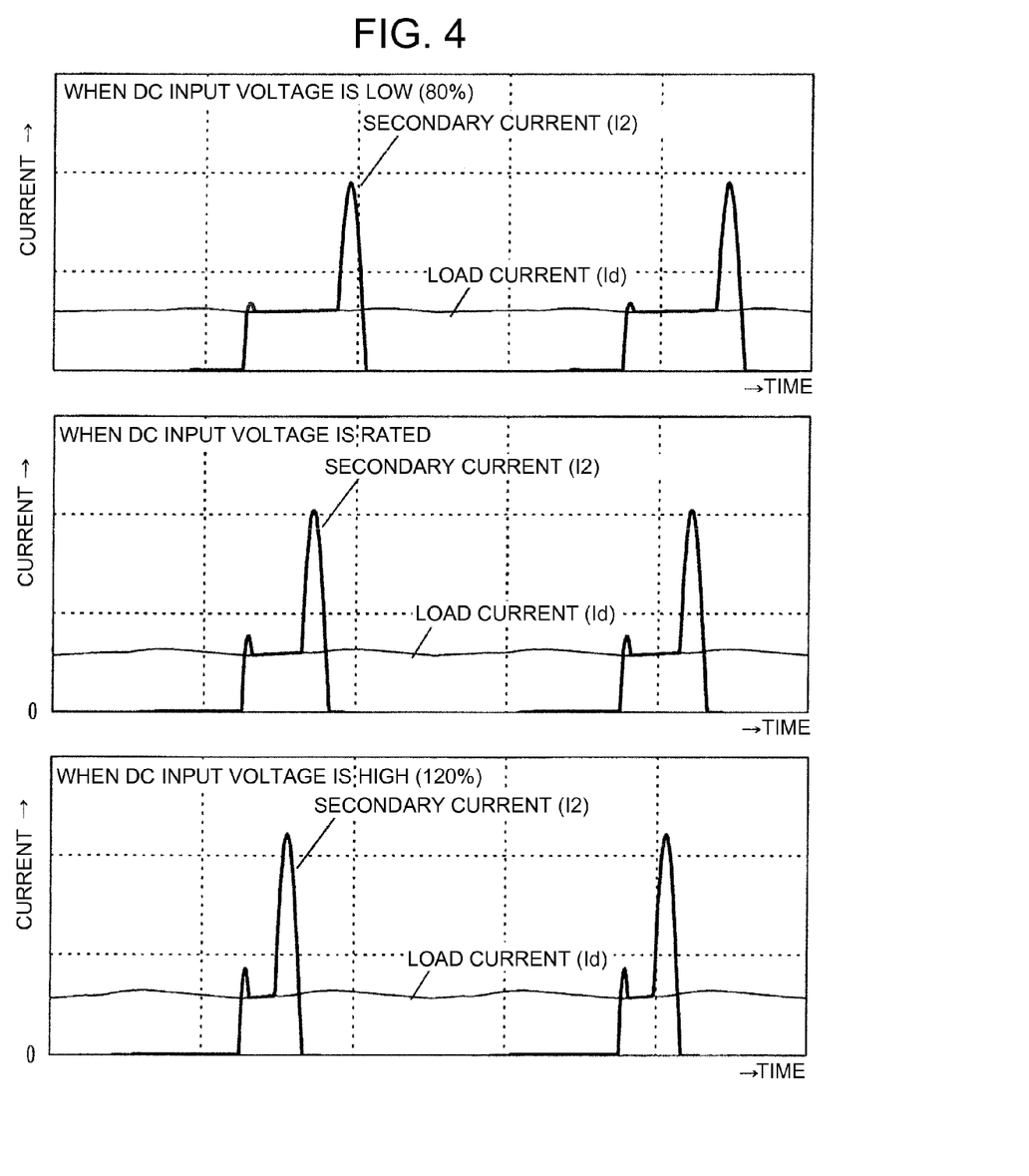
FIG. 4 shows adjustments in accordance with a DC input voltage as the example of the operation waveform according to the present invention.

FIG. 4 shows an example of the operation waveform of the DC power supply according to the present invention. FIG. 4 shows a waveform in a mode where the second PI controller 209 shown in FIG. 2 is operating. In FIG. 4, the following signals are shown from the top.
(1) the secondary current I2 and the load current Id of the transformer 103 when the DC input voltage Vs is a low voltage (80%) when a load is rated
(2) the secondary current I2 and the load current Id of the transformer 103 when the DC input voltage Vs is a rated voltage when the load is rated
(3) the secondary current I2 and the load current Id of the transformer 103 when the DC input voltage Vs is a high voltage (120%) when the load is rated When the resonant current Iz is not flowing, the turn-on time T1 of the converter 102 is determined in accordance with the ratio of the DC input voltage Vs and the DC output voltage Vd. To control the DC output voltage Vd to be constant, it can be simply considered that the turn-on time T1 of the semiconductor devices constituting the converter 102 is inversely proportional to the magnitude of the DC input voltage Vs. However, the magnitude of the resonant current Iz is proportional to the DC input voltage Vs as shown in FIG. 4. Since the energy transferred by the resonant current Iz is proportional to the square of the DC input voltage Vs, the turn-on time T1 of the semiconductor devices constituting the converter 102 becomes shorter than a value that is inversely proportional to the magnitude of the DC input voltage Vs as the DC input voltage Vs is increased. When the load is rated, the load current Id is maintained constant by adjusting the turn-on time T1 of the semiconductor devices constituting the converter 102 in accordance with the DC input voltage Vs.

Figure 5:
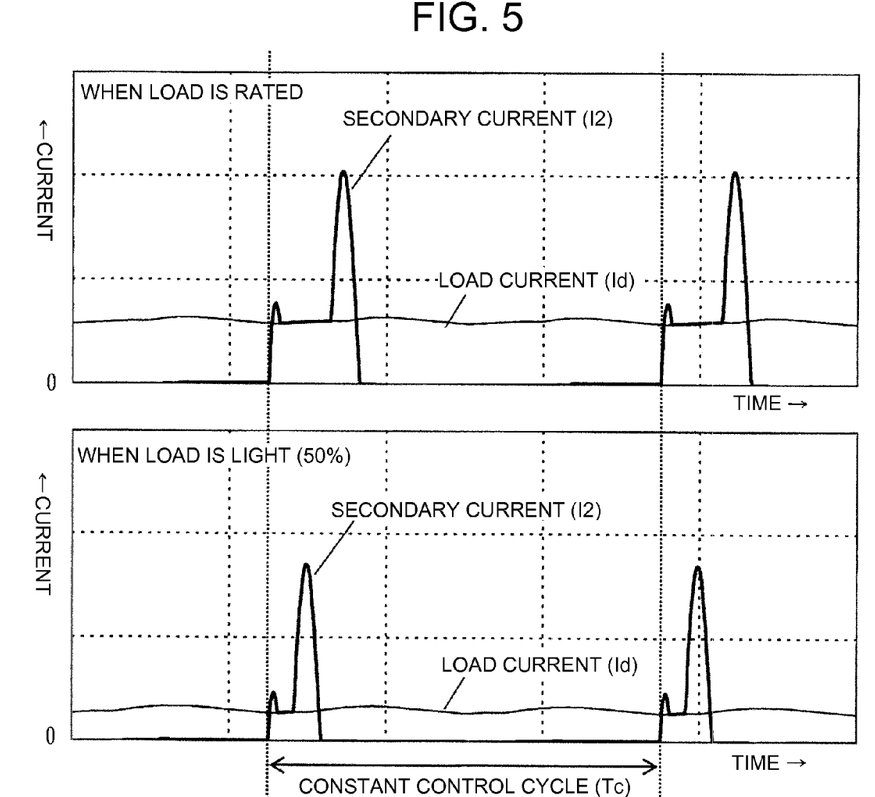
FIG. 5 shows adjustments in accordance with a load factor as the example of the operation waveform according to the present invention.

FIG. 5 shows an example of the operation waveform of the DC power supply according to the present invention. FIG. 5 shows a waveform in a mode where the second PI controller 209 shown in FIG. 2 is operating. In FIG. 5, the following signals are shown from the top.
(1) the secondary current I2 of the transformer 103 and the load current Id when the DC input voltage Vs is a rated voltage when a load is rated
(2) the secondary current I2 of the transformer 103 and the load current Id when the DC input voltage Vs is the rated voltage when a load is light (50%)

When the resonant current Iz does not flow, the turn-on time T1 of the semiconductor devices constituting the converter 102 is constant irrespective of the magnitude of the load current Id. While the converter 102 is on, the load current Id is increased in accordance with the DC input voltage Vs, the DC output voltage Vd, and the inductance of the filter reactor 108. While the converter 102 is off, the load current Id is decreased in accordance with the DC output voltage Vd and the inductance of the filter reactor 108. The state where the increased amount of the load current Id equals to the decreased amount is a steady state. The turn-on time T1 of the semiconductor devices constituting the converter 102 does not depend on the magnitude of the load current Id.

The energy transferred by the resonant current Iz is proportional to the square of the DC input voltage Vs. Accordingly, when the load is light, the turn-on time T1 of the semiconductor devices constituting the converter 102 is required to be shorter than that when the load is rated.

Figure 6:
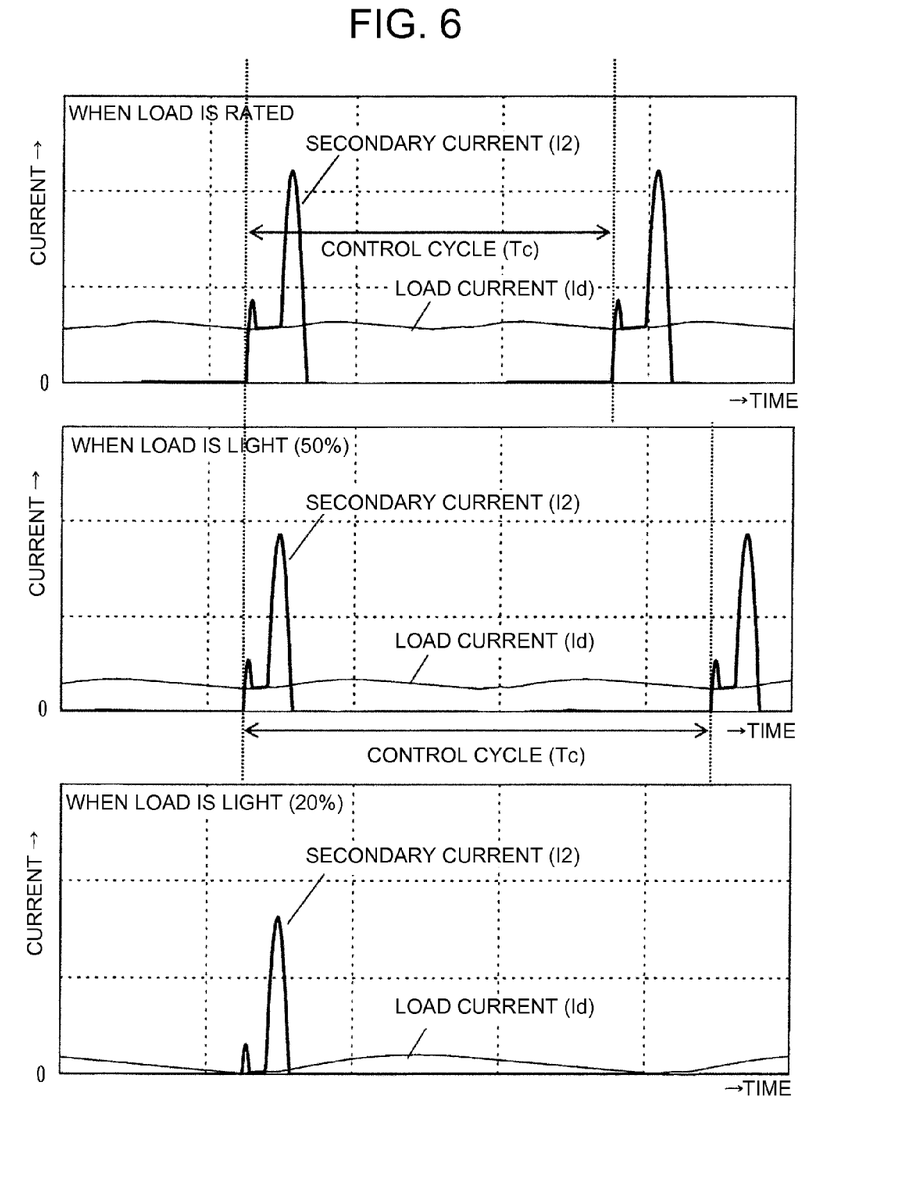
FIG. 6 shows adjustments in accordance with the load factor as the example of the operation waveform according to the present invention.

FIG. 6 shows an example of the operation waveform of the DC power supply according to the present invention. In FIG. 6, the following signals are shown from the top.
(1) the secondary current I2 of the transformer 103 and the load current Id when the DC input voltage Vs is a high voltage (120%) when a load is rated
(2) the secondary current I2 of the transformer 103 and the load current Id when the DC input voltage Vs is a high voltage (120%) when a load is light (50%)
(3) the secondary current I2 of the transformer 103 and the load current Id when the DC input voltage Vs is a high voltage (120%) when a load is light (20%)

When the load becomes light, the supplied power is adjusted by controlling the turn-on time T1 of the semiconductor devices constituting the converter 102 to be shorter than that when the load is rated. The energy transferred by the resonant current Iz is proportional to the square of the DC input voltage Vs. Accordingly, even when the turn-on time T1 of the semiconductor devices constituting the converter 102 is shortened, the turn-on time T1 cannot be lower than the lower limit value T1min of the turn-on time of the semiconductor devices constituting the converter 102 if the DC input voltage Vs is high. Thus, it is impossible to further reduce the supplied power. At this time, the supplied power can be adjusted by setting the converter control cycle Tc of the converter 102 to be longer. FIG. 6 shows a waveform in a mode where the first PI controller 208 shown in FIG. 2 is operating.

To secure a period for sampling and holding the first to third A/D converters 200 to 202, the lower limit value T1min of the turn-on time of the semiconductor devices constituting the converter 102 is required to be larger than the sum of ¾ of the resonant cycle obtained by the electrostatic capacitance of the resonant capacitor 107 and the circuit inductance and ½ of the resonant cycle obtained by the electrostatic capacitance of the snubber capacitor 109 and the circuit inductance.

100: DC voltage source
101: first voltage sensor
102: converter
103: transformer
104: current sensor
105: rectifier circuit
106: resonant switch
107: resonant capacitor
108: filter reactor
109: snubber capacitor
110: snubber diode
111: second voltage sensor
112: filter capacitor
113: load
114: controller
200: first A/D converter
201: second A/D converter
202: third A/D converter
203: first subtractor
204: first PI controller
205: second subtractor
206: A contact switch
207: B contact switch
208: second PI controller
209: third PI controller
210: first adder
211: second adder
212: function table
213: limiter
214: pulse controller
G1 to G4: gate signals of the semiconductor devices Q1 to Q4 constituting the converter 102
Gz: gate signal of the semiconductor device Qz constituting the resonant switch 106
I1: primary current
I2: secondary current
Id: load current
Id*: load current command
Id': load current estimated value
Ir: rectifier diode current
Is: snubber current
Iz: resonant current
T1: turn-on time of the semiconductor device constituting the converter 102
T1min: lower limit value of the turn-on time of the semiconductor device constituting the converter 102
T1*: turn-on time command of the semiconductor device constituting the converter 102
T2: turn-on time of the semiconductor device constituting the resonant switch 106
Tad: trigger signal of the A/D converter
Tc*: initial value of the converter control cycle
Tc: converter control cycle
Q1 to Q4: semiconductor devices constituting the converter 102
Qz: semiconductor device constituting the resonant switch 106
UF: underflow flag
Vd*: DC output voltage command
Vd: DC output voltage
Vr: rectifier diode voltage
Vs: DC input voltage

What is claimed is:
1. A DC power supply comprising:
a DC voltage source,
a converter configured to convert DC power outputted from the DC voltage source to AC power,
a transformer configured to input the AC power outputted from the converter,
a rectifier circuit configured to convert the AC power outputted from the transformer to DC power;
a resonant circuit comprised of a resonant switch and a resonant capacitor connected in parallel to a DC output side of the rectifier circuit;
a filter reactor and a filter capacitor configured to smooth the DC power outputted from the rectifier circuit,
a snubber circuit connected in parallel to the filter capacitor, and
a load connected in parallel to the filter capacitor,
in which the snubber circuit is configured from a diode bridge of a snubber diode and a snubber capacitor configured to connect an output at an intermediate point of the diode bridge and a DC output side of the rectifier circuit,
the DC power supply comprising:
a first voltage sensor configured to detect an output voltage of the DC voltage source;
a second voltage sensor configured to detect a voltage of the filter capacitor;
a current sensor configured to detect an input current or an output current of the transformer; and
a controller configured to input each output signal of the first voltage sensor, the second voltage sensor, and the current sensor, and to output a signal respectively controlling a gate pulse of a plurality of semiconductor devices constituting the converter and a gate pulse of a semiconductor device constituting the resonant switch and a sampling and holding signal for adjusting each detection timing of the first voltage sensor, the second voltage sensor, and the current sensor,
wherein the controller includes:
a first control unit configured to generate a command value of a pulse width of the gate pulse of the converter according to the input from each sensor,
a second control unit configured to generate a command value of an operating frequency of the converter according to the input from each sensor,
a limiter configured to limit the lower limit value of the command value of the pulse width of the gate pulse of the converter to be a value larger than a sum of ¾ of a resonant cycle obtained by an electrostatic capacitance of the resonant capacitor and a circuit inductance and ½ of a resonant cycle obtained by an electrostatic capacitance of the snubber capacitor and the circuit inductance, and
a switch configured to set the command value of the operating frequency of the converter to a fixed value, in a case where the command value of the pulse width of the gate pulse of the converter is larger than the sum of ¾ of the resonant cycle obtained by the electrostatic capacitance of the resonant capacitor and the circuit inductance and ½ of the resonant cycle obtained by the electrostatic capacitance of the snubber capacitor and the circuit inductance.

2. The DC power supply according to claim 1, wherein the controller is configured to output the sampling and holding signal at a timing after ½ of the resonant cycle obtained by an electrostatic capacitance of the snubber capacitor and a circuit inductance from turn-on of the converter, and before ¾ of a resonant cycle obtained by an electrostatic capacitance of the resonant capacitor and the circuit inductance from turn-off of the converter.

3. A DC power supply comprising:
a DC voltage source,
a converter configured to convert DC power outputted from the DC voltage source to AC power,
a transformer configured to input the AC power outputted from the converter,
a rectifier circuit configured to convert the AC power outputted from the transformer to DC power;
a resonant circuit comprised of a resonant switch and a resonant capacitor connected in parallel to a DC output side of the rectifier circuit;
a filter reactor and a filter capacitor configured to smooth the DC power outputted from the rectifier circuit,
a snubber circuit connected in parallel to the filter capacitor, and
a load connected in parallel to the filter capacitor, in which the snubber circuit is configured from a diode bridge of a snubber diode and a snubber capacitor is configured to connect an output at an intermediate point of the diode bridge and a DC output side of the rectifier circuit,
the DC power supply comprising:
a first voltage sensor configured to detect an output voltage of the DC voltage source;
a second voltage sensor configured to detect a voltage of the filter capacitor;
a current sensor configured to detect an input current or an output current of the transformer; and
a controller configured to input each output signal of the first voltage sensor, the second voltage sensor, and the current sensor, and to output a signal respectively controlling a gate pulse of a plurality of semiconductor devices constituting the converter and a gate pulse of a semiconductor device constituting the resonant switch and a sampling and holding signal for adjusting each detection timing of the first voltage sensor, the second voltage sensor, and the current sensor,
wherein the controller is configured to output the sampling and holding signal at a timing after ½ of the resonant cycle obtained by an electrostatic capacitance of the snubber capacitor and a circuit inductance from turn-on of the converter, and before ¾ of a resonant cycle obtained by an electrostatic capacitance of the resonant capacitor and the circuit inductance from turn-off of the converter.

* * * * *